United States Patent

[11] 3,604,529

| [72] | Inventor | John Roderick Fothergill<br>Culcheth, Warrington, England |
|---|---|---|
| [21] | Appl. No. | 821,391 |
| [22] | Filed | May 2, 1969 |
| [45] | Patented | Sept. 14, 1971 |
| [73] | Assignee | United Kingdom Atomic Energy Authority<br>London, England |
| [32] | Priority | May 10, 1968 |
| [33] | | Great Britain |
| [31] | | 22350/68 |

[54] APPARATUS FOR ULTRASONIC WAVE TRANSMISSION
13 Claims, 2 Drawing Figs.

[52] U.S. Cl. ........................................................ 181/.5,
340/1, 340/3
[51] Int. Cl. ........................................................ G01s 9/66,
H04b 11/00
[50] Field of Search ........................................... 340/1, 3, 8
RT, 3 A, 1 L; 181/.5; 333/30, 71

[56] References Cited
UNITED STATES PATENTS

| 2,225,312 | 12/1940 | Mason | 181/.5 |
| 2,408,435 | 10/1946 | Mason | 340/3 A |
| 2,770,795 | 11/1956 | Peterson | 340/3 |
| 2,856,022 | 10/1958 | Kurtze et al. | 181/.5 |
| 3,100,994 | 8/1963 | Junger | 340/1 L |

Primary Examiner—Richard A. Farley
Attorney—Larson, Taylor & Hinds

ABSTRACT: A waveguide for the transmission of ultrasonic waves adapted to operate immersed in a liquid consists of a duct capable of transmitting ultrasonic waves produced by a generator at the end of the duct. The duct has an outer jacket defining a closed volume about the duct preventing access of liquid, in which the waveguide is immersed, to the outer surface of the duct. By this means energy loss due to wave scatter at the outer surface of the duct is minimized.

APPARATUS FOR ULTRASONIC WAVE TRANSMISSION

BACKGROUND OF THE INVENTION

The present invention relates to apparatus for ultrasonic wave transmission.

SUMMARY OF THE INVENTION

According to a broad aspect of the present invention a waveguide for the transmission of ultrasonic waves comprises a transmission means defining a solid or liquid filled path adapted for the passage therethrough of said waves and jacketing means adapted to enclose an evacuated, or a vapor or gas filled, volume about the path, the volume being adapted to serve as an ultrasonic discontinuity for ultrasonic waves tending to pass from the path into said volume. Waves having this tendency are caused by the ultrasonic discontinuity to be partially or totally reflected or refracted back into the transmission path.

DESCRIPTION OF THE DRAWING

An embodiment of the invention will now be described, by way of example, with reference to the accompanying diagrammatic drawing in which both

DESCRIPTION OF THE PREFERRED EMBODIMENTS

Figure 1:
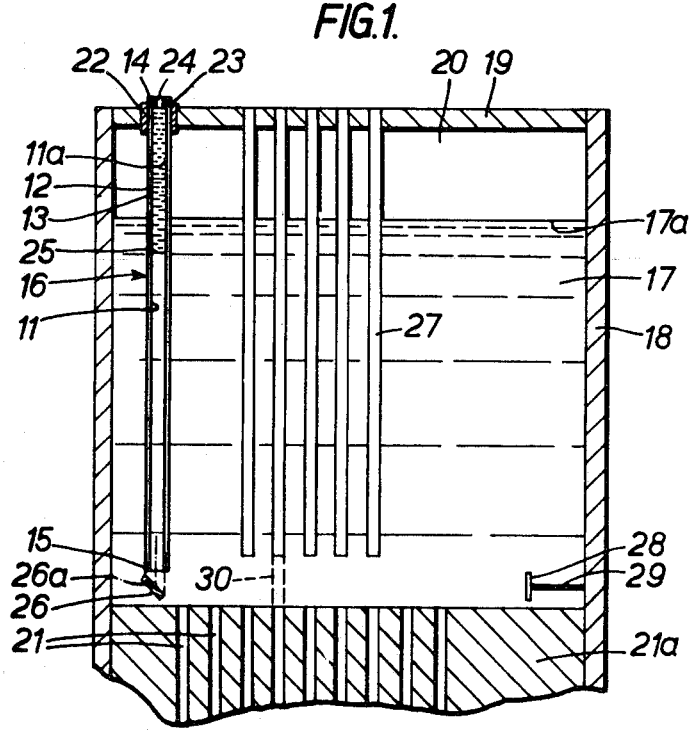
FIG. 1 and FIG. 2 are views in medial section.

FIG. 1 shows a waveguide, for the transmission of ultrasonic waves, comprising a transmission duct means embodied in a tube 11 of stainless steel adapted for filling with liquid surrounded by a jacketing means embodied by jacket 12 also of stainless steel. Annular space 13 defined between tube 11 and jacket 12 is closed vacuum tightly by end plates 14, 15 at either end of the tube 11 and the space 13 evacuated. One general application for the waveguide formed by the tube 11 and jacket 12 is as a part of an ultrasonic scanner 16 whereby the presence of an object within a given scanning path can be signalled. In a particular form of this general application, the scanner is incorporated in a fast nuclear reactor of the sodium-cooled type wherein the reactor core is submerged in a pool 17 of liquid sodium metal and it is desired to detect whether there is free space clearance above the core to enable refueling operations, involving the rotation of a shield above the core, to take place. The sodium pool 17 with free surface 17a is contained in a vessel having walls 18 and covered by rotatable shield 19 which retains an inert atmosphere 20 of argon gas above the free surface 17a of the pool 17. Liquid sodium circulates upwardly along ducts 21 (part shown) formed by a plurality of nuclear fuel subassemblies which comprise the core 21a, shown diagrammatically, of the nuclear reactor. Some of the ducts are employed for accommodating control rods for the reactor, and access tubes 27 accommodate the control rods when withdrawn from the reactor core. In order to be able to rotate the shield 19, to which the tubes 27 are secured, it is necessary to insert the control rods in the core, disconnect them, and ensure that there is free space clearance between the top of the core 21a and the lower end of the tubes 27. The ultrasonic scanner can fulfill this purpose, and will be described in more detail hereafter.

The scanner 16 passes revolvably through the shield 19 by way of a gastight gland 22. The upper end 11a of tube 11 is closed by a plate 23 in which is mounted an ultrasonic transducer 24 utilizing a barium titanate crystal. A stainless steel diaphragm 25 encloses a liquid mixture of sodium and potassium (in the proportions by weight 70:30 respectively) which serves to couple the transducer 24 to the diaphragm 25. The tube 11 below the diaphragm is filled with sodium from pool 17, so allowing the transducer 24 to be replaced or repaired without exposing pool sodium to the atmosphere above the shield 19. The transducer 24 is connected to conventional equipment (not shown) for generating, receiving and analyzing ultrasonic waves.

At the lower end of the scanner 16 there is mounted a concave mirror 26 of stainless steel which can be rotated about an axis indicated by point 26a and perpendicular to the local longitudinal axis of the tube 11 (shown by the short dot-and-dash line adjacent mirror 26) by remote control means (not shown) above the shield 19.

A reflector 28 of stainless steel is mounted in the pool 17 by a stay 29 from the wall 18 at the same vertical height above the top of the core 21a as the scanning mirror 26. The scanner 16, amongst other functions, allows checks to be carried out that no control gear has been left projecting from the tubes 27, for example, the control component 30 indicated in dotted lines in the drawing.

In order to detect objects such as component 30, transducer 24 is energized so that ultrasonic waves are generated to pass through the sodium-potassium mixture in upper end 11a of the tube 11 across diaphragm 25 and through the sodium of pool 17 filling the lower part of tube 11. The evacuated annular space 13 surrounding tube 11 causes ultrasonic waves in the tube which strike the tube wall to be reflected back into the tube. In effect the space 13 serves as a reflector for the waves by acting as as ultrasonic wave discontinuity. By using this means of internal reflection, energy attenuation due to spreading of the waves is minimized. In this respect diaphragm 25 does not unduly attenuate the energy of ultrasonic wave passing through it. Ultrasonic waves from the tube 11 falling on mirror 26 are reflected out into the pool 17 and, with the mirror directed as shown, a substantial proportion of the waves will strike the reflector 28 and so be returned to the mirror 26. Returning waves will be reflected back up tube 11 and can be detected and analyzed by way of transducer 24 and its associated equipment. The time for an ultrasonic wave to leave the transducer 24 and return and a knowledge of the speed of the waves will allow the distance of the reflector 28 from the mirror 26 to be determined. A component 30 lying in the path of a transmitted ultrasonic wave from the mirror will thus be detected either by interruption of a reflected wave returning from the reflector or by direct reflection of the wave by the object itself, either of which can be detected. The distance between the mirror 26 and the component 30 can be accurately determined by calculation or calibration and, with a knowledge of the direction in which the mirror 26 is facing relative to a datum direction, the location of the component 30 relative to that datum can be determined. If necessary; and where some foreign body other than an orientated component is detected, the scanner 16 can be rotated about its longitudinal axis to enable the lateral boundaries of the foreign body to be determined. By rotation of mirror 26 about its axis 26a, the upper boundary of the body can be found. The concave form of mirror 26 causes a focusing of the waves falling on it. Some geometrical scattering of ultrasonic waves from mirror 26 will occur in passing through the pool 17. The discrimination possible with the scanner will depend to a large extent on the distance between the mirror 26 and a detected component or body. However, with a component or body close to mirror 26 advantage can be taken of the increased discrimination possible to detect distinguishing marks, silhouette, pattern or like features.

Figure 2:
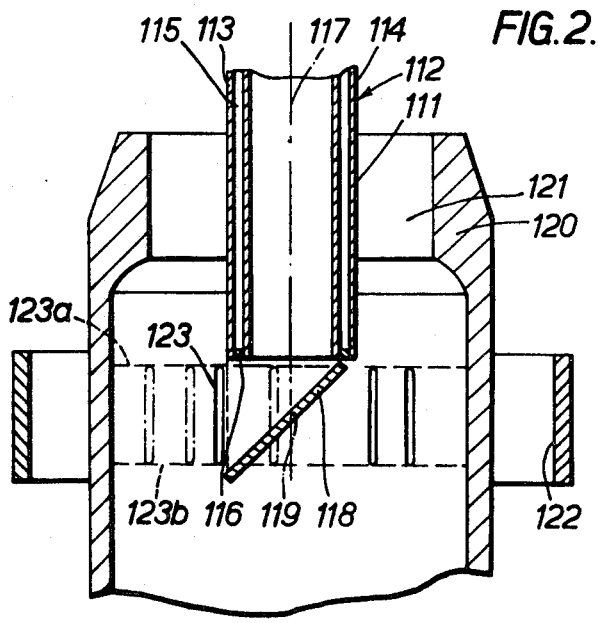

FIG. 2 shows the lower section 111 of a scanner 112 similar both in form and in operation to that shown in Figure 1 and hereinbefore described. The scanner 112 is made up of a tube 113 and jacket 114 defining between them an evacuated annular space 115 sealed by end plate 116. The scanner 112 is rotatable about its longitudinal axis 117 by means not shown. A mirror 118 of stainless steel mounted at the foot of tube 113 is rotatable about axis 119 which is perpendicular to axis 117. The scanner 112 is shown in a position resulting from the lower section 111 having been lowered into the upper part of a nuclear fuel subassembly 120 (part shown) located in the reactor core and providing a duct 121 for sodium coolant. An external annular stainless steel reflector 122 is positioned to coincide with a sequence of slots (typically slots 123) cut in a well of the subassembly 120 and disposed between axial limits 123a and b (shown dashed). By rotation and operation of the scanner 112 (with ultrasonic wave generation and reflection as described in connection with scanner 16 of Figure 1) the angular location of slots 123 in the sequence can be determined since waves from mirror 118 will either be reflected back to the mirror from the wall of subassembly 120 (where no slots exists) or will be reflected from reflector 122 (after passing through a slot 123). With the difference in distances involved, the difference between these reflections is clearly detectable. By varying in a suitable manner the number and disposition of slots as between different subassemblies, any given subassembly in an array can be recognized.

The scanner 16 of FIG. 1 and scanner 112 of FIG. 2 as described both use evacuated jackets to provide an ultrasonic wave discontinuity. However, jackets filled with gases such as argon or krypton or a vapor could be used for an environment unsuitable for vacuum operation or where the expense of vacuumtight manufacture is deemed unnecessary.

Although reflector means are described in both embodiments of the invention they are not essential for operation, since virtually any obstruction in the path of a given ultrasonic wave will cause either reflection of an incident wave or interruption of a reflected one.

Although a liquid-filled tube has been utilized as a transmission path it is also feasible to use a solid bar for the transmission of the ultrasonic waves. A jacketing means, as described will still be required. Use of a waveguide according to the invention avoids energy loss due to wave spreading occurring when ultrasonic sound is allowed to spread freely from a source. Thus using the waveguide, useful transmission of ultrasonic sound over a range of some one hundred and twenty feet has been achieved.

The waveguide allows the ultrasonic transducer to be mounted remotely from the region being scanned. This is particularly advantageous if the region is at high temperature, is highly radioactive, or is otherwise deleterious to the transducer or to personnel needing to work in the vicinity of the transducer.

The waveguide allows the transmission path to be in several different materials if required. In this way combinations of liquid and solid paths can be used depending upon the nature of ambient conditions along the path. In the case of two different liquids (as described above in connection with FIG. 1) a diaphragm can be inserted in the path to separate them. Two different solids can conveniently be coupled by a section of liquid filled path.

The embodiments described above utilize an ultrasonic transducer as the sound source for waves transmitted along the transmission path. Use in this way could be termed active insofar as the waveguide transmits ultrasonic waves in both directions along it. It is also possible to use the waveguide in a passive sense where it transmits waves along it in one direction only. In this way the waveguide could be used as a movable "listening" probe. It could, for example, be used in the pool of sodium described above to listen selectively to sound sources in the pool (e.g., to detect the seat of sodium boiling) by positioning one end of the waveguide near the sound source. Waves transmitted along the tube can then be detected by a suitable ultrasonic sensor at the other end of the waveguide.

I claim:

1. A waveguide for the transmission of ultrasonic waves adapted to operate immersed in a liquid, comprising duct means defining a transmission path capable of allowing the passage therethrough of said waves, and jacketing means for said duct means defining a closed discontinuity volume about the duct means for preventing access of liquid, in which the waveguide is immersed, to the outer surface of the duct means to thereby minimize ultrasonic energy loss due to wave scatter at the outer surface of the duct means.

2. A waveguide according to claim 1 wherein the discontinuity volume defined about the path contains a gas or vapor.

3. A waveguide according to claim 1 wherein the discontinuity volume defined about the path is evacuated.

4. A waveguide according to claim 1 including an ultrasonic wave detector mounted at one end of said duct means.

5. A waveguide according to claim 1 including an ultrasonic wave generator means mounted at one end of said duct means.

6. A waveguide according to claim 4 wherein an ultrasonic wave generator is also mounted at said end of the duct means.

7. A waveguide according to claim 1 wherein the duct means contains a liquid and is traversed by a diaphragm for separating the path defined by said duct into two sections.

8. A waveguide according to claim 1 wherein the duct means contains a solid over a part of the length thereof and a liquid over the remaining length thereof.

9. A waveguide according to claim 1 including a mirror mounted at the end of said duct to deflect ultrasonic waves into or out of said duct.

10. A waveguide according to claim 9 including means for varying the reflecting angle of the mirror.

11. A waveguide according to claim 9 wherein the mirror has a nonplanar reflecting surface.

12. A waveguide according to claim 11 wherein the mirror surface is concave.

13. A waveguide according to claim 1 further comprising means for rotating said duct about its longitudinal axis in a stationary mounting therefor.